United States Patent
Ravichandran

(10) Patent No.: US 11,050,801 B2
(45) Date of Patent: Jun. 29, 2021

(54) CALL TO MEETING UPGRADE

(71) Applicant: T-Mobile USA, Inc., Bellevue, WA (US)

(72) Inventor: Vinod Ravichandran, Renton, WA (US)

(73) Assignee: T-Mobile USA, Inc., Bellevue, WA (US)

(*) Notice: Subject to any disclaimer, the term of this patent is extended or adjusted under 35 U.S.C. 154(b) by 83 days.

(21) Appl. No.: 16/209,740

(22) Filed: Dec. 4, 2018

(65) Prior Publication Data

US 2020/0177647 A1    Jun. 4, 2020

(51) Int. Cl.
*G06F 15/16* (2006.01)
*H04L 29/06* (2006.01)
*H04N 7/15* (2006.01)

(52) U.S. Cl.
CPC ........ *H04L 65/403* (2013.01); *H04L 65/1006* (2013.01); *H04L 65/1016* (2013.01); *H04L 65/1046* (2013.01); *H04L 65/1069* (2013.01); *H04N 7/15* (2013.01)

(58) Field of Classification Search
CPC ............. H04L 65/1006; H04L 65/1016; H04L 65/1046; H04L 65/1069; H04L 65/403; H04L 65/1063; H04L 65/1093; H04N 7/15; H04N 7/152
See application file for complete search history.

(56) References Cited

U.S. PATENT DOCUMENTS

| | | | |
|---|---|---|---|
| 6,018,360 A * | 1/2000 | Stewart | H04N 7/152 348/14.09 |
| 8,300,790 B2 | 10/2012 | Buford et al. | |
| 9,256,457 B1 * | 2/2016 | Leske | H04L 65/1069 |
| 2007/0268891 A1 | 11/2007 | Schukat et al. | |
| 2010/0061539 A1 | 3/2010 | Cloran et al. | |
| 2012/0294436 A1 * | 11/2012 | Park | H04M 3/564 379/202.01 |
| 2019/0303087 A1 * | 10/2019 | Tsukamoto | H04L 12/1822 |

OTHER PUBLICATIONS

The PCT Search Report and Written Opinion dated Mar. 9, 2020 for PCT Application No. PCT/US2019/062369, 13 pages.

* cited by examiner

*Primary Examiner* — Ryan J Jakovac
(74) *Attorney, Agent, or Firm* — Lee & Hayes, P.C.

(57) ABSTRACT

During a call session between a first user equipment (UE) and a second UE managed by a call application server, the first UE can send a request to a conference application server to upgrade the call session to a meeting session. The conference application server can set up the meeting session. Once the first UE and the second UE have joined the meeting session with the conference application server, the first UE and the second UE can end their legs of the original call session with the call application server. The first UE and the second UE can transition their user interfaces from a call mode to a meeting mode upon joining the meeting session, such that users are seamlessly transitioned from a call to a meeting.

16 Claims, 9 Drawing Sheets

CALL TO MEETING UPGRADE

BACKGROUND

Mobile phones and other user equipment (UE) can be connected to a telecommunication network to engage in many forms of communication. For example, a call session can connect UEs through the telecommunication network. Such call sessions can include one-to-one audio and/or video calls.

UEs can also be connected in a meeting session. Meeting sessions can provide users with access to additional features that go beyond what is available in routine one-to-one audio calls or video calls. For example, meeting sessions can provide whiteboard functions that allow users to create drawings on their UE that can be shared with other UEs, screen sharing functions that allow users of other UEs to view what is being displayed on some or all of a particular UE's screen, recording functions, group conferencing functions, and/or any other type of meeting function.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

User equipment (UE) connected to wireless communication networks can engage in calls, including audio calls and video calls, natively through the wireless communication networks. For example, wireless communication networks can have call application servers that assist in setting up and managing call sessions between UEs.

However, while conventional audio or video calls can be useful ways for users to communicate, users may desire to instead have their UEs connect to a meeting session that provides features that conventional calls may not allow or support. For example, meeting sessions may provide a whiteboard function that allows users to create drawings on their UEs that can be seen on and/or edited by other UEs. As another example, meeting sessions may provide a screen sharing function, in which images displayed on the screen of one UE can be shared and viewed on other UEs. Meeting sessions can also provide recording functions, group conferencing functions, file sharing functions, collaborative document editing functions, and/or any other type of meeting function.

Although standalone applications exist that can provide such meeting functions to UEs if the UEs have the applications installed or connect via a website to a meeting portal, users who are already engaged in a conventional audio or video call may need to end their current audio or video call, load the standalone meeting application, and then begin a new meeting session through the standalone meeting application. This process of ending one form of communication and manually taking steps to begin another form of communication can take time and can be frustrating to users. For example, while users may have engaged in the original audio or video call using phone numbers, the users may need to ask each other for usernames associated with a particular standalone meeting application in order to connect with each other through a separate session using that separate standalone meeting application.

Described herein are systems and methods that allow users to upgrade an existing call session to a meeting session, such that the users can seamlessly transfer from an audio or video call to a meeting session that provides additional meeting features.

Example Environments

Figure 1:
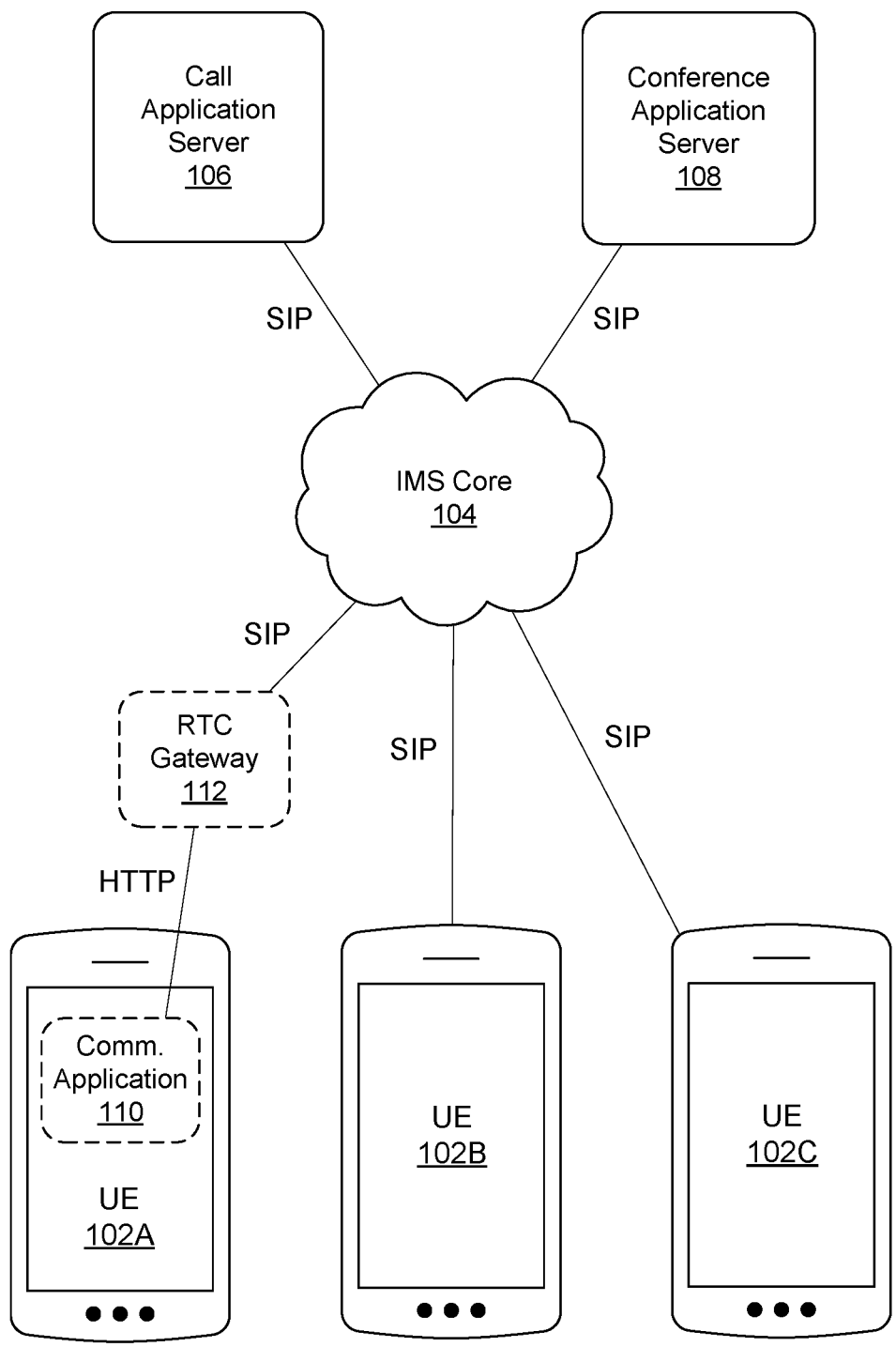
FIG. 1 depicts an example environment in which user equipment (UE) can connect to a telecommunication network.

FIG. 1 depicts an example environment in which user equipment (UE) 102 can connect to a telecommunication network to make or receive calls, transmit or receive data, and/or perform any other network operation. A UE 102 can be any device that can wirelessly connect to the telecommunication network. For example, a UE 102 can be a smart phone, a cellular phone, a personal digital assistant (PDA), a personal computer (PC), a laptop, a desktop, a workstation, a media player, a tablet, a gaming device, a smart watch, or any other type of computing or communication device.

Elements of the telecommunication network can be compatible with one or more wireless access technologies, such as fifth generation (5G) technologies, Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, and/or any other previous or future generation of wireless access technology.

Although not shown in FIG. 1, the telecommunication network can include base stations to which UEs 102 can wirelessly connect, as well as a core network connected to the base stations. For example, in an LTE network, a base station can be an evolved Node B (eNB), while the core network can be an Evolved Packet Core (EPC). In some examples, UEs 102 can connect to the telecommunication network via other types of access points and connections, such as a connection over the Internet via a Wi-Fi access point.

The telecommunication network can also include an Internet Protocol (IP) Multimedia Subsystem (IMS) linked to the core network. The IMS can have one or more elements that can set up and/or manage communication sessions for UEs 102. Elements of the IMS can use Session Initiation Protocol (SIP) messages to exchange information with each other and/or UEs 102. For example, the IMS can include an IMS core 104 with one or more Call Session Control Functions (CSCFs) that process and/or route SIP messages, including Proxy CSCFs (P-CSCFs), Interrogating-CSCFs (I-CSCFs), and/or Serving-CSCFs (S-CSCFs).

The IMS core 104 can be linked to one or more application servers that provide services for communication sessions, including a call application server 106 and a conference application server 108. In some examples, messages can be sent between a call application server 106 and a conference application server 108 directly, while in other examples such messages sent between a call application server 106 and a conference application server 108 can be routed through the IMS core 104. In still other examples, functions of the call application server 106 and conference application server 108 can be performed by the same node or server, such that the messages described herein as being exchanged between the call application server 106 and conference application server 108 can be exchanged between functions within a single node or server.

The call application server 106 can set up and manage call sessions between UEs 102. The call application server 106 can exchange SIP messages with UEs 102, elements of the IMS core 104, and/or other network elements to set up and/or manage a call session. For example, a call application server 106 can receive a SIP INVITE sent by a first UE 102 to initiate a call session with a second UE 102, and can forward the SIP INVITE message on to the second UE 102. A response from the second UE 102, as well as other messages exchanged between the first UE 102 and the second UE 102 regarding set up or management of a call session, can pass through the call application server 106.

The description herein refers to a call application server 106 processing messages sent to or from a UE 102, or to or from other network elements. However, in some examples, multiple call application servers 106 can work together to route messages through the telecommunication network. For example, although only one call application server 106 is shown in FIG. 1, in some situations a first UE 102 may be associated with a different call application server 106 than a second UE 102. In these situations, a first call application server 106 associated with the first UE 102 can forward a message for the second UE 102 to the second call application server 106, which can in turn forward the message on to the second UE 102.

The conference application server 108 can set up and manage meeting sessions between UEs 102. The conference application server 108 can exchange SIP messages with UEs 102, the call application server 106, elements of the IMS core 104, and/or other network elements to set up and/or manage a meeting session. For example, as will be discussed further below, the conference application server 108 can receive a SIP message from a UE 102 that requests setup of a new meeting session. In response, the conference application server 108 can prepare network resources for a new meeting session and return a SIP message with details about the new meeting session that the UEs 102 can use to connect to the meeting session. For example, the conference application server 108 can return a SIP message with Session Description Protocol (SDP) information describing a meeting session, including link information such as a Uniform Resource Locator (URL) or Uniform Resource Identifier (URI) indicating where the meeting session can be accessed, a meeting identifier, a dial-in number, an access code, and/or any other meeting information.

A UE 102 can run or access a communication application 110 that provides both call and meeting functions. For instance, the communication application 110 can be associated with a subscriber's account and can be used to make and receive calls instead of, or in addition to, UE 102 systems that rely on a Subscriber Identity Module (SIM) to identify a subscriber and make or receive calls. In some examples, the communication application 110 can be an application that is preinstalled on a UE 102 as the UE's 102 native phone or call dialing application, or is part of the UE's 102 operating system. In other examples, the communication application 110 can be a separate application that can be run instead of, or as an augmentation to, a UE's native phone or call dialing application. In still other examples, the communication application 110 can run on a server on the telecommunication network and can be accessed by a UE 102 as a service through a web browser or other interface.

In some examples, the communication application 110 can send or receive information through a Real-Time Communication (RTC) gateway 112 of the telecommunication network. For example, the communication application 110 and the RTC gateway 112 can exchange information using HTTP Hypertext Transfer Protocol (HTTP) or any other protocol, while the RCT gateway 112 can use SIP to exchange information with the IMS core 104, the call application server 106, the conference application server 108, and/or any other network element. Accordingly, an RTC gateway 112 can translate information received from a UE's communication application 110 into SIP messages, and translate SIP messages from other network elements into HTTP or another protocol understood by the UE's communication application 110. As an example, FIG. 1 depicts a communication application 110 running on UE 102A, with HTTP traffic from the communication application being converted into SIP traffic by an RTC gateway 112.

In other examples, a UE 102 can send or receive SIP messages for a communication application 110 directly without interpretation by an RTC gateway 112. For example, the UE 102 may be able to send or receive SIP messages for the communication application natively, such as if the communication application 110 is integrated into a UE's operating system or if the communication application 110 is otherwise configured to natively send and receive SIP messages. As an example, FIG. 1 depicts UEs 102B and 102C natively sending and receiving SIP messages for their instances of a communication application 110 (not shown).

Although the description herein refers to UEs 102 sending and receiving SIP messages, it should be understood that in some examples this can refer to communication applications 110 run on, or accessed by, the UEs 102 sending or receiving the SIP messages. Additionally, it should be understood that, in some examples, messages sent or received by UEs 102 or their communication applications 110 can be in another format, but can be translated to or from SIP by an RTC gateway 112 or other network element.

A UE 102, through an associated communication application 110 and/or an RTC gateway 112, can use SIP messages to establish a dialog with one or more other UEs 102. The dialog can represent communications between the UEs 102, and can include a call session and/or a meeting session.

As described herein, when a dialog includes a call session and a new meeting session is created, the dialog can continue via the meeting session even when the call session is terminated, such that communications between the UEs 102 can continue.

Figure 2:
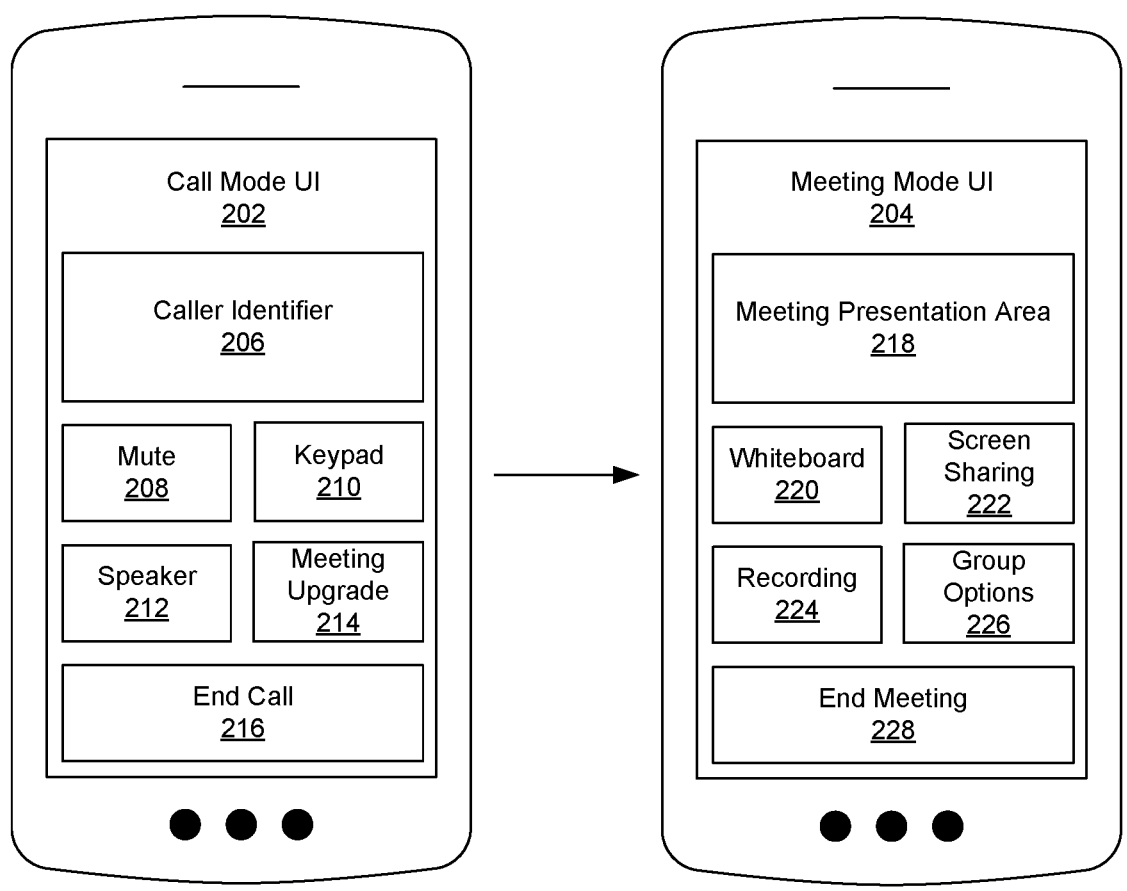
FIG. 2 depicts an example of user interface (UI) modes for a communication application that can provide functions for both call sessions and meeting sessions during dialogs between UEs.

FIG. 2 depicts an example of user interface (UI) modes for a communication application 110. As noted above, a communication application 110 can provide functions for both call sessions and meeting sessions during dialogs between UEs 102. The communication application 110 can accordingly have a call mode UI 202 and a meeting mode UI 204, and can transition between displaying the two UIs and enabling their corresponding functions depending on whether a call session or a meeting session is active during a dialog between UEs 102.

The call mode UI 202 can display information and/or options related to a current or pending call session. A call mode UI 202 can include a caller identifier 206, a mute selector 208, a keypad selector 210, a speakerphone selector 212, a meeting upgrade selector 214, and an end call selector 216. The caller identifier 206 can display a name, phone number, picture, and/or other information about another party to a call. When the call is a video call, the caller identifier 206 can also display video of the other party. The mute selector 208, when activated by a user, can turn a mute mode on and off during a call. The keypad selector 210, when activated by a user, can provide a number pad for dialing a phone number or for entering numbers during a call. The speakerphone selector 212, when activated by a user, can turn a speakerphone option on and off during a call. The meeting upgrade selector 214, when activated by a user, can initiate the call to meeting upgrade process described herein, by which UEs 102 engaged in one or more call sessions can be seamlessly transferred to a new meeting session within the same dialog as described herein. When the UE 102 is transitioned from a call session to a new meeting session during a dialog, the communication application's UI can change from the call mode UI 202 to the meeting mode UI 204 without indicating that the call session has ended. From a user's perspective, the transition between the call mode UI 202 to the meeting mode 204 can lead to a perception that an existing call has been seamlessly upgraded to a meeting without additional user input to separately set up the meeting. The end call selector 216, when activated by a user, can end a current call.

The call mode UI 202 shown in FIG. 2 is only an example, and a call mode UI 202 can have more or fewer elements than is shown in FIG. 2. The call mode UI 202 may also change depending on the status of the call, with different types of information being displayed when a new call is being dialed, when a call is ringing, when a call is active, or when a call has been hung up. In some examples, the call mode UI 202 may also change based on whether a call is an audio call or a video call, for instance displaying camera options when a video call is active.

The meeting mode UI 204 can display information and/or options related to a current or pending meeting session. The meeting mode UI 204 can include a meeting presentation area 218, a whiteboard selector 220, a screen sharing selector 222, a recording selector 224, group options 226, and/or an end meeting selector 228.

The meeting presentation area 218 can display information that can be viewable to meeting participants. For example, the meeting presentation area 218 can display a list of meeting participants, a whiteboard space associated with a whiteboard function, screens shared by one or more meeting participants via a screen sharing function, video of one or more meeting participants, files shared by one or more meeting participants, a collaborative document editing screen, and/or any other information associated with a meeting session.

The whiteboard selector 220, when activated by a user, can initiate a whiteboard function that can allow a user to create drawings on their UE 102 that are visible by and/or editable by other participants of a meeting session. In some examples, a whiteboard and/or created drawings can be visible in the meeting presentation area 218 or other portion of the meeting mode UI 204. In some examples, data associated with drawings created via a whiteboard function during a meeting session can be uploaded to and stored at a conference application server 108 so that it is accessible by other meeting participants.

The screen sharing selector 222, when activated by a user, can initiate a screen sharing function that can allow at least some of the images displayed on a UE 102 to be shared with other participants of a meeting session. For example, when a screen sharing function is activated at a first UE 102, the UE's display can be mirrored to other UEs 102 in a meeting presentation area 218 of their communication applications 110, and users of the other UEs 102 can watch as a user of the first UE 102 interacts with the communication application 110 or other applications on the first UE 102. In some examples, data associated with the screen sharing function during a meeting session can be uploaded to and stored at a conference application server 108 so that it is accessible by other meeting participants.

The recording selector 224, when activated by a user, can initiate a recording process in which information associated with a meeting session is recorded and stored for later playback or review. In some examples, data recorded during a meeting session can be uploaded to and stored at a conference application server 108 so that it is later accessible by one or more meeting participants. In other examples, data recorded during a meeting session can be stored locally at a UE 102.

The group options 226 can allow a user to invite other meeting participants to a meeting session or otherwise manage the participants to the meeting session. For example, when UE 102A shown in FIG. 1 upgrades an audio call session with UE 102B to a meeting session as described herein, the group options 226 can allow a user to UE 102A to invite UE 102C to the meeting session. In some situations, UE 102A may have had separate audio call sessions with UE 102B and UE 102C, can upgrade the call session with UE 102B to a meeting session using the meeting upgrade selector 214 of the call mode UI 202, and then use the group options 226 to bring UE 102C into the meeting session. In other situations, UE 102C may not have been in an existing call session with UE 102A, but a user of UE 102A can use the group options 226 to add UE 102C after a meeting session has begun.

The end meeting selector 228, when activated by a user, can end a current meeting session.

The meeting mode UI 204 shown in FIG. 2 is only an example, and a meeting mode UI 204 can have more or fewer elements than is shown in FIG. 2. The call mode UI 202 may also change depending on the status of a meeting session. For example, the meeting presentation area 218 and/or other elements of the meeting mode UI 204 can change to display different types of information depending on how many participants are connected to the meeting session and/or what meeting features are active or are supported by the conference application server 108 for a particular meeting session.

Figure 3:
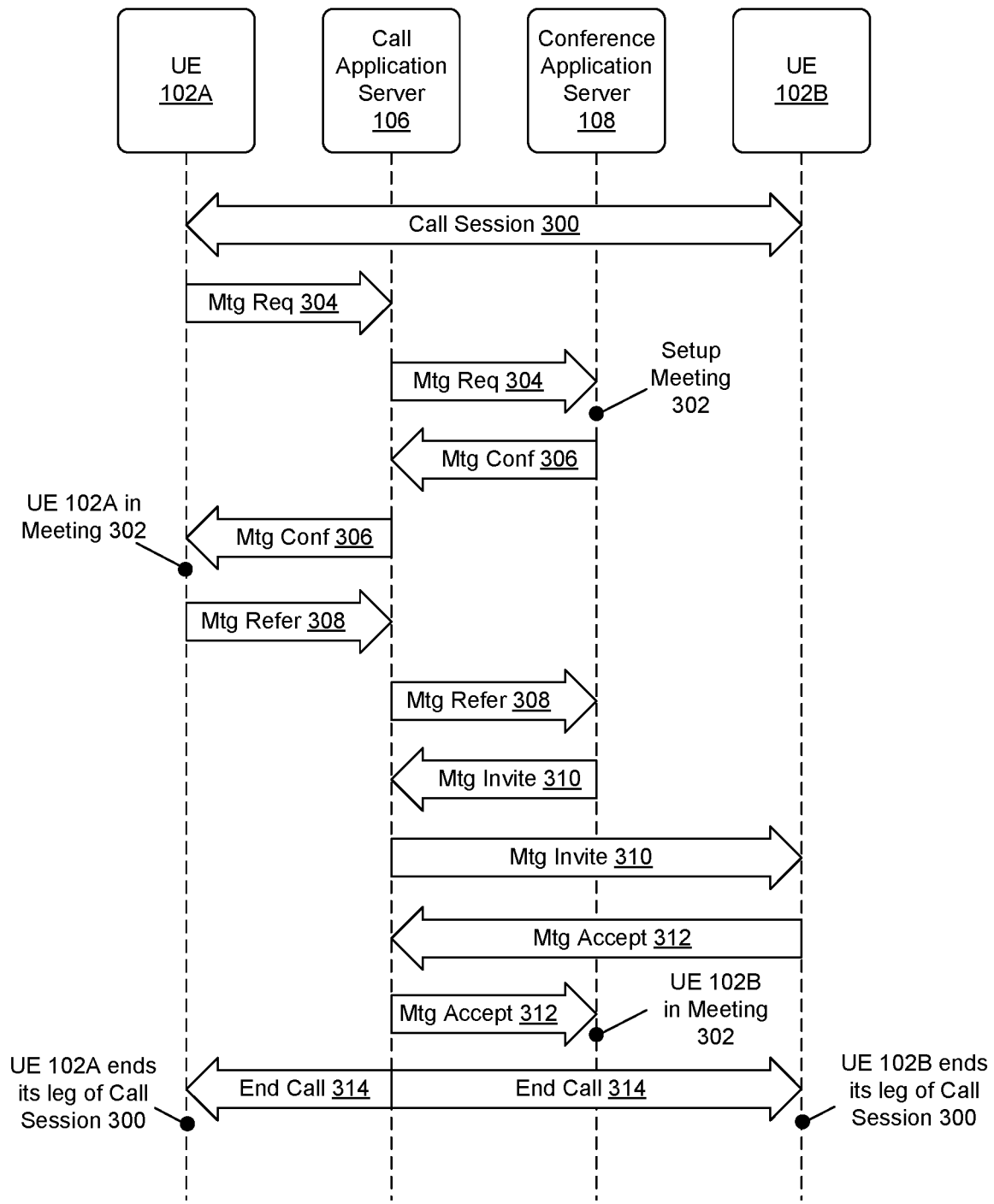
FIG. 3 depicts an example of a message flow that can be used during a call to meeting upgrade process to transition from a call session to a meeting session.

FIG. 3 depicts an example of a message flow that can be used during a call to meeting upgrade process to transition communications associated with a dialog between UE 102A and UE 102B from a call session 300 to a meeting session 302. At the beginning of the message flow, UE 102A can be engaged in a call session 300 with UE 102B. The call session 300 can be a session for an audio call or a video call. For example, the call session 300 can be a Real-Time Transport Protocol (RTP) session that uses RTP to transport audio and/or video data over IP-based elements of the telecommunication network. In some examples, the call session 300 may be established between UE 102A and UE 102B using SIP messages exchanged between UE 102A, the call application server 106, and UE 102B. For example, UE 102A can initiate the call session 300 by sending a SIP INVITE message to the call application server 106, which can forward the SIP INVITE to the UE 102B. To accept the call, UE 102B can reply with a SIP message including a "200 OK" response, and the call session 300 can be established between the UEs 102.

In some situations, UE 102A can put the call session 300 with UE 102B on hold in order to begin a second call session 300 with a third UE 102, such as UE 102C shown in FIG. 1. For example, UE 102A can send a new SIP INVITE to the call application server 106 to initiate a new call session 300 with UE 102C, or accept a new SIP INVITE that originated from UE 102C. After the second call session 300 with UE 102C has been set up, UE 102A can keep the call session 300 with UE 102B on hold, place the second call session 300 with UE 102C on hold and return to the call session 300 with UE 102B, alternate between the call sessions 300, and/or end one or both call sessions 300. In this situation, UE 102A may have dialogs with both UE 102B and UE 102C.

While a dialog's call session 300 for an audio or video call is active, a user of UE 102A may choose to upgrade the dialog from the call session 300 to a meeting session 302. For example, the user can input a command to upgrade the current call session 300 to a meeting session 302, such as selecting a meeting upgrade selector 214 in a call mode UI 202 of a communication application 110. In response to user input requesting an upgrade from the call session 300 to a meeting session 302, UE 102A can send a meeting request 304 to the conference application server 108. In some examples, the UE 102A can send the meeting request 304 to the call application server 106, which can then forward the meeting request 304 on to the conference application server 108 as shown in FIG. 3. However, in other examples the UE 102A can send the meeting request 304 directly to the conference application server 108 without the meeting request 304 passing through the call application server 106.

The meeting request 304 can be sent as a SIP INVITE message, or any other type of message. The meeting request 304 can have a header or message body that specifies information about the requested meeting session 302, such as a number of participants, participant identifiers, requested meeting features, and/or any other information. For example, a meeting request 304 can include such information in an XML, formatted message body. In some examples, the meeting request 304 can include identifiers of the UE 102 requesting the meeting session 302 and/or identifiers of other expected meeting participants, such as Mobile Station International Subscriber Directory Numbers (MSISDNs) or other identifiers associated with UE 102A and/or UE 102B. The meeting request 304 can include the same type of identifier for a UE 102 that would be used to initiate a call session 300. For example, an MSISDN associated with a UE 102 can be used to set up the initial call session 300, as well as to set up a new meeting session 304 during a call to meeting upgrade process.

Upon receipt of the meeting request 304, the conference application server 108 can set up the requested meeting session 302. For example, the conference application server 108 can dedicate computing and/or network resources for the meeting session 302, assign a meeting ID number or other identifier to the meeting session 302, assign an access code for the meeting session 302, and/or perform any other operation to prepare the meeting session 302. Although UEs 102 that were already parties to one or more call sessions 300 with UE 102A can be joined into the meeting session 302 as discussed herein, in some examples the conference application server 108 can also assign a dial-in number for the meeting session 302, such that users of other UEs 102 may alternately be able to join the meeting session 302 by placing a conventional phone call to the dial-in number.

After setting up the meeting session 302, the conference application server 108 can send a meeting confirmation 306 back to the UE 102A, such as a SIP message indicating a response code of "200 OK." In some examples, the conference application server 108 can send the meeting confirmation 306 to the call application server 106, which can then forward the meeting confirmation 306 on to the UE 102A as shown in FIG. 3. However, in other examples the conference application server 108 can send the meeting confirmation 306 directly to the UE 102A without the meeting confirmation 306 passing through the call application server 106.

The meeting confirmation 306 sent by the conference application server 108 can include a header and/or message body with details about the meeting session 302, such as link information, a meeting identifier, a dial-in number, an access code, and/or any other meeting information. For example, the meeting confirmation 306 can include a message body with SDP information that defines a profile for the meeting session 302 and/or XML information about the meeting session 302. UE 102A can use the meeting information in the meeting confirmation 306 to join the meeting session 302. For example, UE 102A can use link information, a meeting ID, an access code, and/or any other information in the meeting confirmation 306 to join the meeting session 302 set up by the conference application server 108.

When UE 102 receives the meeting confirmation 306 and joins the meeting session 302, a UI displayed by the UE 102A can transition from a call mode UI 202 to a meeting mode UI 204. At this point UE 102A may be at least temporarily engaged in both the original call session 300 and the new meeting session 302, however options and information presented to the user may transition to only reflecting the meeting session 302 in a meeting mode UI 204. Accordingly, from the user's perspective, an existing call has been seamlessly converted to a meeting without the user needing to end the existing call and separately set up the meeting. The UE 102 and/or its communication application 110 can consider the call session 300 and the meeting session 302 to be part of the same dialog with UE 102B, such that the beginning of the meeting session 302 does not terminate the dialog and the user is instead transitioned seamlessly from the call to the meeting.

After UE 102A has joined the meeting session 302, UE 102A can send a meeting referral 308 to the conference application server 108. In some examples, the UE 102A can send the meeting referral 308 to the call application server 106, which can then forward the meeting referral 308 on to the conference application server 108 as shown in FIG. 3. However, in other examples the UE 102A can send the meeting referral 308 directly to the conference application server 108 without the meeting referral 308 passing through the call application server 106.

The meeting referral 308 can indicate that the conference application server 108 should invite one or more identified UEs 102 to the meeting session 302. For example, because a user of UE 102A wanted to upgrade a call session 300 with UE 102B to the meeting session 302, UE 102A can send a meeting referral 308 that instructs the conference application server 108 to invite UE 102B to the meeting session 302. If UE 102A had been engaged in multiple call sessions 300, such as a call session with UE 102B that had been on hold and another call session 300 with UE 102C that was active, the meeting referral 308 can identify both UE 102B and UE 102C as UEs 102 that should be invited to the meeting session 302.

In some examples, a meeting referral 308 can be a SIP REFER message. In other examples, a meeting referral 308 can be a SIP INVITE message or any other type of message. The meeting referral 308 can have a header or message body that indicates an identifier for one or more UEs 102 that are to be invited to the meeting session 302, as well as SDP or other information about the meeting session 302. For example, the meeting referral 308 can be a SIP REFER message with a header including an MSISDN or other identifier associated with UE 102B and the meeting ID provided to UE 102A in the meeting confirmation 306. As discussed further below, in some examples a meeting referral 308 containing identifiers of UEs 102 that should be invited to a meeting session 302 can be included in an initial meeting request 304 rather than being included in a separate meeting referral 308 message.

In some examples, the conference application server 108 can return an acceptance message, directly or through the call application server 106, to UE 102A to confirm that it will be inviting the UEs 102 identified in the meeting referral 308 to the meeting session 302. In some examples, the conference application server 108 may also send messages, such as SIP NOTIFY messages, to UE 102A directly or through the call application server 106 to indicate that the conference application server 108 is attempting to invite the identified UEs 102 or has succeeded in joining them to the meeting session 302, and/or to provide any other update about the status of the meeting session 302.

In response to receipt of the meeting referral 308, the conference application server 108 can send UE 102B a meeting invitation 310 that invites UE 102B to the meeting session 302. The meeting invitation 310 can include a header or message body that includes an identifier of UE 102B. In some examples, the meeting invitation 310 can be a SIP INVITE message. The meeting invitation 310 can also include SDP information or other information about the meeting session 302, such as link information, a meeting identifier, a dial-in number, an access code, and/or any other meeting information.

In some examples, the conference application server 108 can send the meeting invitation 310 to the call application server 106, which can then forward the meeting invitation 310 on to UE 102B as shown in FIG. 3. However, in other examples the conference application server 108 can send the meeting invitation 310 directly to UE 102B without the meeting invitation 310 passing through the call application server 106.

UE 102B can join the meeting session 302 based on the meeting information in the meeting invitation 310. In some examples, because UE 102B is still engaged in its leg of the original call session 300 through the call application server 106, UE 102B may interpret the meeting invitation 310 received via the call application server 106 as a re-invite message that modifies the existing dialog according to the new SDP or other information associated with the meeting session 302.

UE 102B can also send a meeting acceptance 312, such as a SIP "200 OK" message, to the conference application server 108 in response to the meeting invitation 310. In some examples, UE 102B can send the meeting acceptance 312 to the call application server 106, which can then forward the meeting acceptance 312 on to the conference application server 108 as shown in FIG. 3. However, in other examples UE 102B can send the meeting acceptance 312 directly to the conference application server 108 without the meeting acceptance 312 passing through the call application server 106.

In examples in which the call application server 106 serves as an intermediary between the conference application server 108 and the UEs 102 during exchange of the meeting request 304, meeting confirmation 306, meeting referral 308, meeting invitation 310, and the meeting acceptance 312, the call application server 106 can review those messages to determine when both UE 102A and UE 102B have joined the meeting session 302. Accordingly, after UE 102B sends the meeting acceptance 312, the call application server 106 can send end call instructions 314 to both UE 10A and UE 102B, such as a SIP "BYE" messages. The end call instruction 314 can cause the legs of the call session 300 between UE 102A and UE 102B to be terminated, thereby releasing network resources that may have been devoted to those legs.

In other examples in which the UEs 102 exchange messages directly with the confirmation application server 108, after UE 102A and UE 102B have both joined the meeting session 302 following UE 102B's meeting acceptance 312, UE 102A can send an end call instruction 314, such as a SIP "BYE" message, that causes the original call session 300 to be terminated.

At this point, although both legs of the original call session 300 between UE 102A and UE 102B have been terminated, the previously existing dialog between UE 102A and UE 102B can remain active and both UEs 102 can have joined the meeting session 302. Users of UE 102A and UE 102B can continue communicating through the meeting session 302 using audio or video, as well as through additional meeting features that may not have been available during the original call session 300. For example, when UE 102B receives the meeting invitation 310 and joins the meeting session 302, a UI displayed by UE 102B can transition from a call mode UI 202 to a meeting mode UI 204.

In some examples, a transition from a previously existing call session 300 to a new meeting session 302, and an associated UI transition, may occur at UE 102B without user input at UE 102B. For example, when UA 102A and UE 102B are engaged in a call, a user of UA 102A can provide user input to initiate a call to meeting upgrade process. As part of that call to meeting upgrade process, UE 102B can receive a meeting invitation 310 and automatically join a new meeting session 302 in response, such that a user of UE 102B perceives the call transitioning to a meeting automatically and seamlessly.

Although FIG. 3 depicts the conference application server 108 sending a meeting invitation 310 to UE 102B, the conference application server 108 may also send a similar meeting invitation 310 to UE 102C and/or any other UEs 102 identified in a meeting referral 308. For example, when UE 102A had a first call session 300 with UE 102B on hold and had a second call session 300 with UE 102C active when UE 102A began the call to meeting process, UE 102A can send a meeting referral 308 requesting that both UE 102B and UE 102C be invited to the meeting session 302 by the conference application server 108. In this situation, UE 102B and UE 102C can both receive a meeting invitation 310 and both can respond by joining the meeting session 302 as active meeting participants along with UE 102A, even though UE 102B had been on hold. When UE 102B and UE 102C join the meeting session 302 and send meeting acceptances 312 back to the conference application server 108, messages can also be sent to both UE 102B and UE 102C to end their legs of previous call sessions 300. For example, the call application server 106 can send one end call instruction 314 to UE 102B to end its leg of the original first call session 300 and another end call instruction 314 to UE 102C to end its leg of the original second call session 300.

As shown in FIG. 3, in some examples UE 102A can send a meeting request 304 to set up a meeting session 302, followed later by a meeting referral 308 that identifies other UEs 102, such as UE 102B and/or UE 102C, as meeting participants that the conference application server 108 should invite to the meeting session 302. However, in other examples, the initial meeting request 304 sent by UE 102A can include a meeting referral 308 or other information identifying UE 102B, UE 102C, and/or any other UEs 102 as meeting participants that should be invited to the meeting session 302. Accordingly, in situations in which the initial meeting request 304 identifies other UEs 102 as meeting participants that are to be invited to the meeting session 302, the conference application server 108 can send meeting invitations 310 to the identified UEs 102 in response to the initial meeting request 304 instead of in response to receipt of a later meeting referral 308.

Example Architecture

Figure 4:
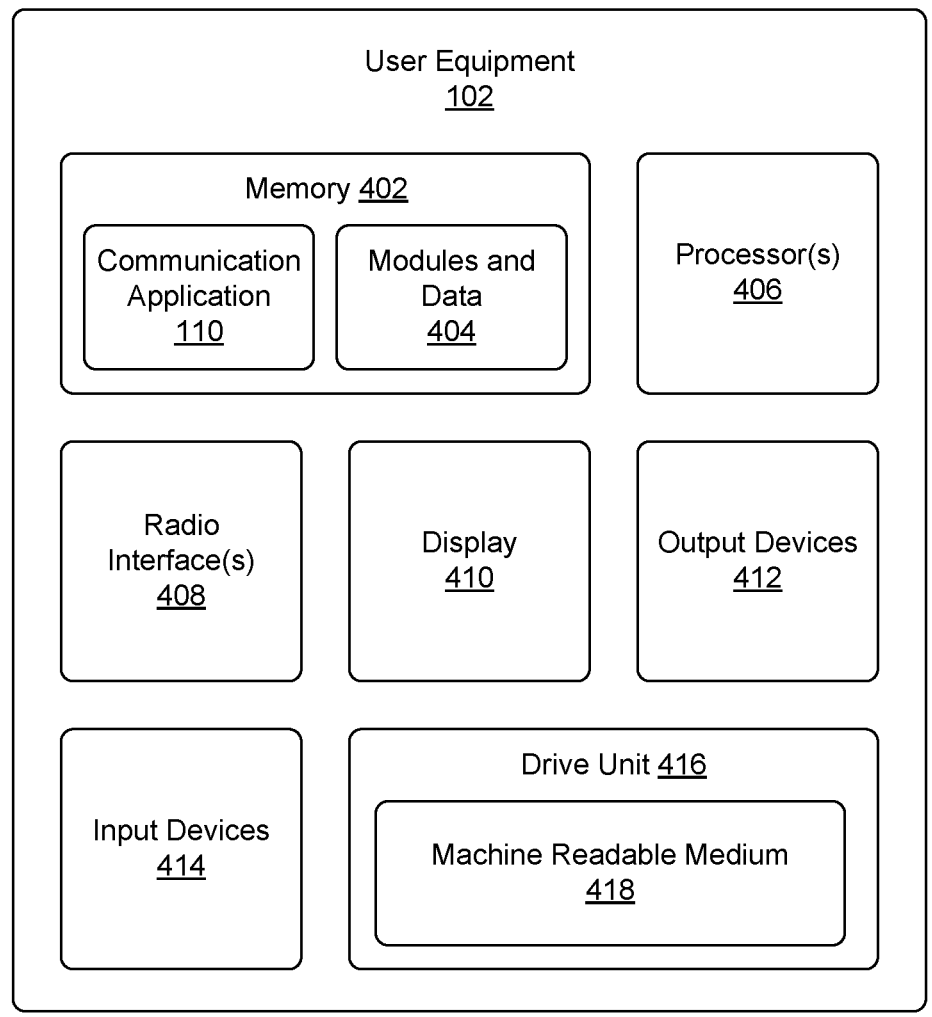
FIG. 4 depicts an example system architecture for a UE.

FIG. 4 depicts an example system architecture for a UE 102, in accordance with various examples. As shown, a UE 102 can include a memory 402 that stores a communication application 110 and other modules and data 404, processor(s) 406, radio interfaces 408, a display 410, output devices 412, input devices 414, and/or a drive unit 416 including a machine readable medium 418.

In various examples, memory 402 can include system memory, which may be volatile (such as RAM), non-volatile (such as ROM, flash memory, etc.) or some combination of the two. Memory 402 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102.

The memory 402 can store computer-readable instructions and/or other data associated with a communication application 110 that can provide both call and meeting functions to a user of the UE 102. In some examples, the communication application 110 can be an application or operating system component that is stored in the memory 402. In other examples, the communication application 110 can be run through a web browser or other interface from a server or other remote location, however some or all parts of the communication application 110, or related data, can be at least temporarily stored in the memory 402.

The memory 402 can also store other modules and data 404 that can be utilized by the UE 102 to perform or enable performing any action taken by the UE 102. The modules and data 404 can include a UE platform and applications, and data utilized by the platform and applications.

In various examples, the processor(s) 406 can be a central processing unit (CPU), a graphics processing unit (GPU), or both CPU and GPU, or any other type of processing unit. Each of the one or more processor(s) 406 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 406 may also be responsible for executing all computer applications stored in the memory 402, which can be associated with common types of volatile (RAM) and/or nonvolatile (ROM) memory.

The radio interfaces 408 can include transceivers, modems, interfaces, antennas, and/or other components that perform or assist in exchanging radio frequency (RF) communications with a base station of a wireless telecommunication network, or an alternate access point through which the UE 102 can reach a telecommunication network. For example, a UE 102 can have radio interfaces 408 compatible with LTE, Wi-Fi, and/or any other type of wireless connection.

The display 410 can be a liquid crystal display or any other type of display commonly used in UEs 102. For example, display 410 may be a touch-sensitive display screen, and can then also act as an input device or keypad, such as for providing a soft-key keyboard, navigation buttons, or any other type of input.

The output devices 412 can include any sort of output devices known in the art, such as a display 410, speakers, a vibrating mechanism, and/or a tactile feedback mechanism. Output devices 412 can also include ports for one or more peripheral devices, such as headphones, peripheral speakers, and/or a peripheral display.

The input devices 414 can include any sort of input devices known in the art. For example, input devices 414 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 418 can store one or more sets of instructions, such as software or firmware, that embodies any one or more of the methodologies or functions described herein. The instructions can also reside, completely or at least partially, within the memory 402, processor(s) 406, and/or radio interface(s) 408 during execution thereof by the UE 102. The memory 402 and the processor(s) 406 also can constitute machine readable media 418.

Figure 5:
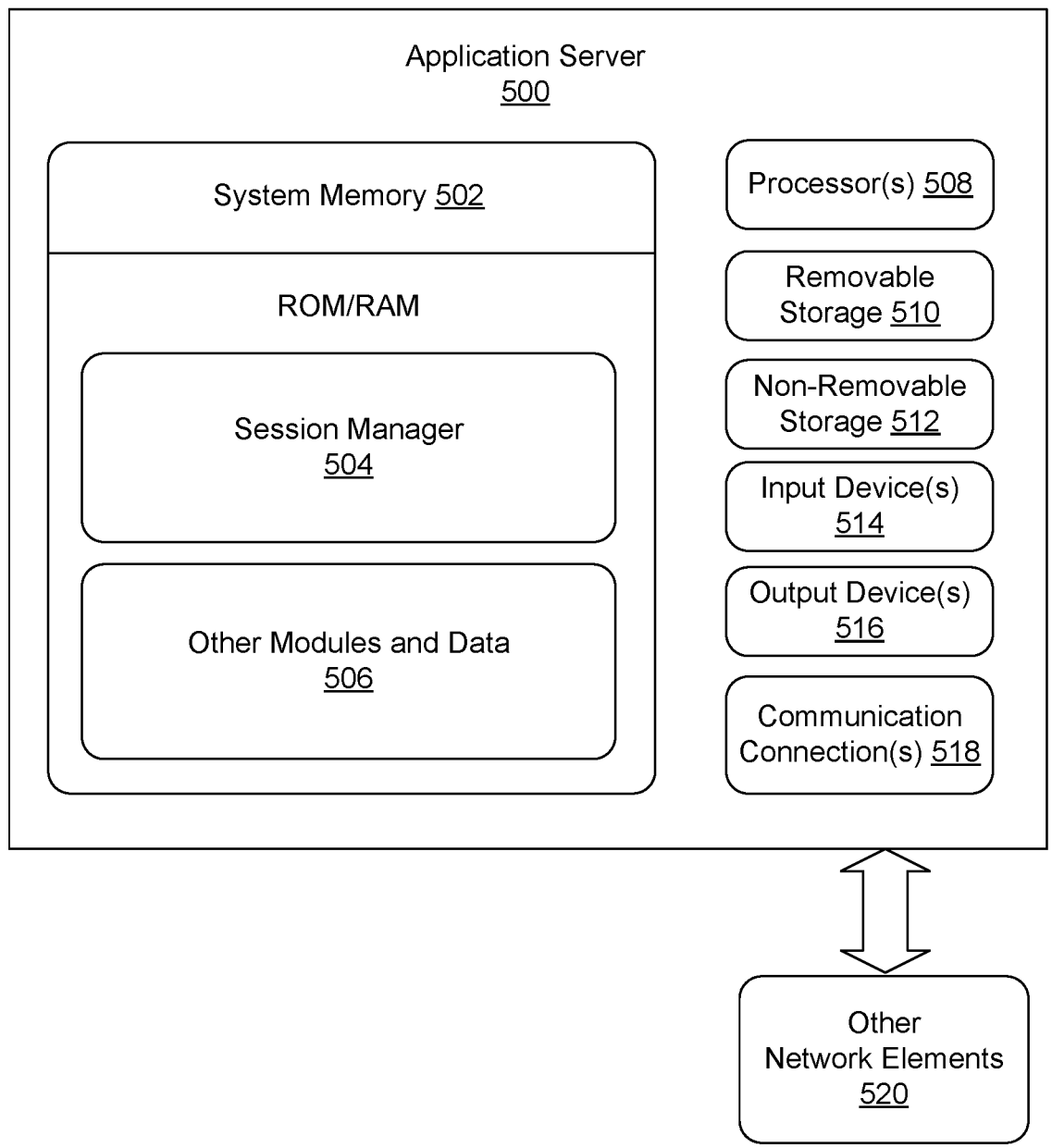
FIG. 5 depicts an example system architecture of an application server.

FIG. 5 depicts an example system architecture of an application server 500. An application server 500 can be a call application server 106 and/or a conference application server 108. An application server 500 can have a system memory 502. The system memory 502 can store data for the application server 500, including a session manager 504 and/or other modules and data 506. The application server 500 can also include processor(s) 508, removable storage 510, non-removable storage 512, input device(s) 514, output device(s) 516, and/or communication connections 518 for communicating with other network elements 520.

In various examples, system memory 502 can be volatile (such as RAM), non-volatile (such as ROM, flash memory, etc.), or some combination of the two. Example system memory 502 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The session manager 504 can be configured to set up and manage communication sessions that are part of a dialog between UEs 102. The session manager 504 can manage communication sessions at least in part based on SIP messages received, generated, or forwarded by the application server 500. For example, when the application server 500 is a call application server 106, a session manager 504 can set up, manage, and/or tear down legs of a call session 300 between UEs 102 based on SIP messages and/or forward SIP messages to and from a conference application server 108 associated with setup of a meeting session 302 during a call to meeting upgrade process as shown in FIG. 3. As another example, when the application server 500 is a conference application server 108, a session manager 504 can set up and manage a meeting session 302 requested as part of a call to meeting upgrade process, including receiving a meeting request 304 and a meeting referral 308, and sending meeting invitations 310 as shown in FIG. 3.

The other modules and data 506 can be utilized by the application server 500 to perform or enable performing any action taken by the application server 500. The other modules and data 506 can include a platform and applications, and data utilized by the platform and applications.

In some embodiments, the processor(s) 508 can be a central processing unit (CPU), a graphics processing unit (GPU), both CPU and GPU, or other processing unit or component known in the art.

The application server 500 can also include additional data storage devices (removable and/or non-removable) such as, for example, magnetic disks, optical disks, or tape. Such additional storage is illustrated in FIG. 5 by removable storage 510 and non-removable storage 512. Computer storage media may include volatile and nonvolatile, removable and non-removable media implemented in any method or technology for storage of information, such as computer readable instructions, data structures, program modules, or other data. System memory 502, removable storage 510 and non-removable storage 512 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the application server 500. Any such computer-readable storage media can be part of the application server 500. In various examples, any or all of system memory 502, removable storage 510, and non-removable storage 512, store programming instructions which, when executed, implement some or all of the herein-described operations of the application server 500.

In some examples, the application server 500 can also have input device(s) 514, such as a keyboard, a mouse, a touch-sensitive display, voice input device, etc., and/or output device(s) 516 such as a display, speakers, a printer, etc. These devices are well known in the art and need not be discussed at length here.

The application server 500 can also contain communication connections 518 that allow the application server 500 to communicate with other network elements 520, such as the IMS core 104 or other application servers 500. For example, a communication connection 518 can allow the application server to exchange SIP messages with UEs 102 through the IMS core 104. As another example, when the application server 500 is a call application server 106, the call application server 106 can use a communication connection 518 to forward SIP messages to or from a conference application server 108.

Example Operations

Figure 6:
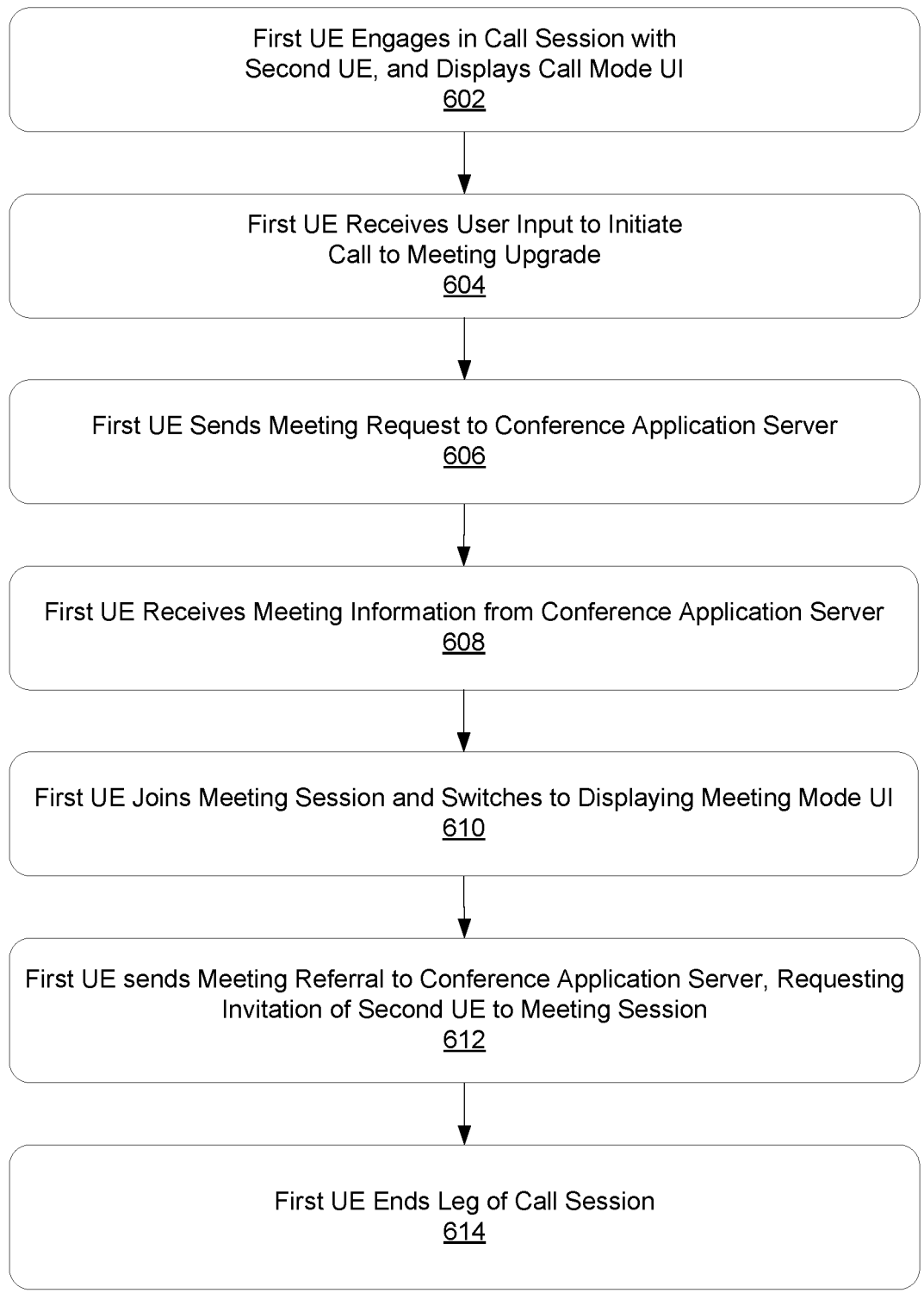
FIG. 6 depicts a flow chart of an example process for upgrading a call to a meeting based on user input at a first UE.

FIG. 6 depicts a flow chart of an example process for upgrading a call to a meeting based on user input at a first UE 102. In some examples, the first UE 102 can be UE 102A shown in FIGS. 1 and 3.

At operation 602, the first UE 102 can be engaged in a call session 300 with a second UE 102, such as UE 102B shown in FIGS. 1 and 3. For example, the first and second UEs 102 can have exchanged SIP messages through or more call application servers 106 to establish a call session 300 as part of a dialog between the first and second UEs 102. The first UE 102 can display a call mode UI 202 during the call session 300, for example via a communication application 110 that can provide both call and meeting functions.

At operation 604, the first UE 102 can receive user input instructing the first UE 102 to initiate a call to meeting upgrade. For example, the user input can be an activation of a meeting upgrade selector 214 displayed in a call mode UI 202 of a communication application 110.

At operation 606, in response to the user input instructing the first UE 102 to initiate a call to meeting upgrade, the first UE 102 can send a meeting request 304 to a conference application server 108. In some examples, the first UE 102 can send the meeting request 304 to the conference application server 108 via the call application server 106 to which it is already connected with respect to the call session 300. However, in other examples, the first UE 102 can send the meeting request 304 directly to the conference application server 108.

At operation 608, the first UE 102 can receive meeting information about a new meeting session 302 established by the conference application server 108 in response to the meeting request 304. In some examples, the first UE 102 can receive the meeting information in a meeting confirmation 306 that was received by the call application server 106 from the conference application server 108 and forwarded by the call application server 106 to the first UE 102. In other examples, the first UE 102 can receive the meeting information in a meeting confirmation 306 sent directly to the first UE 102 from the conference application server 108.

At operation 610, the first UE 102 can join the meeting session 302 and change the displayed UI to a meeting mode UI 204. For example, a communication application 110 handling the call session 300 can use the meeting information, such as a link, meeting ID, and/or other information to join the meeting session 302 established by the conference application server 108 and transition its display from the call mode UI 202 to the meeting mode UI 204. The first UE 102 can join the meeting session 302 as part of the same dialog with the second UE 102, such that the dialog is not terminated despite the transition from the call session 300 to the meeting session 302.

At operation 612, the first UE 102 can send a meeting referral 308 to the conference application server 108. The meeting referral 308 can include the meeting information about the meeting session 302 and an identifier associated with the second UE 102, such that the conference application server 108 can invite the second UE 102 to the meeting session 302. In some examples, the first UE 102 can send the meeting referral 308 to the call application server 106, which can then forward the meeting referral 308 to the conference application server 108. However, in other examples, the first UE 102 can send the meeting referral 308 directly to the conference application server 108. In some examples, if a meeting referral 308 or other information identifying the second UE 102 as a meeting participant was included in the meeting request 304 sent at operation 606, operation 612 can be skipped.

At operation 614, the first UE 102 can terminate its leg of the original call session 300. In some examples, the first UE 102 can receive an end call instruction 314 from the call application server 106 that causes the first UE 102 or its communication application 110 to terminate the first UE's leg of the call session 300. In other examples, an end call instruction 314 can be a notification that the call application server 106 has terminated the leg of the call session 300. In still other examples, after both the first UE 102 and the second UE 102 have joined the meeting session 302, the first UE 102 can transmit an end call instruction 314 to the call application server 106 and/or the second UE 102 to cause the original call session 300 to be terminated.

Despite termination of the call session 300, due to the switch to presenting the meeting mode UI 204 and/or because the first UE 102 considers the meeting session 302 to be part of the same dialog with the second UE 102 as the original call session 300, the transition to the meeting session 302 can appear to a user of the first UE 102 to be a seamless upgrade from the call to a meeting.

Figure 7:
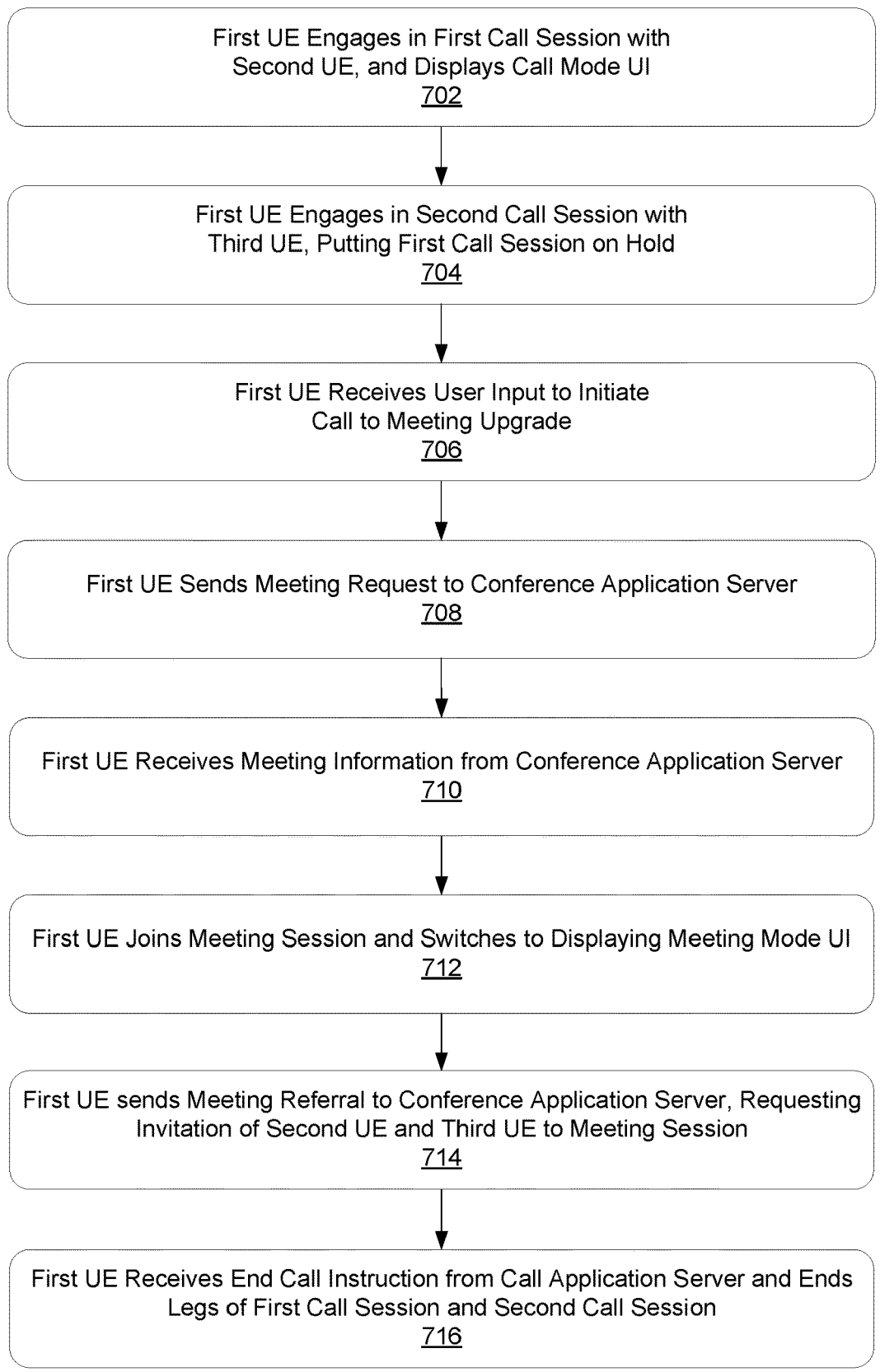
FIG. 7 depicts a flow chart of an example process for upgrading multiple calls to a single meeting based on user input at a first UE.

FIG. 7 depicts a flow chart of an example process for upgrading multiple calls to a single meeting based on user input at a first UE 102. In some examples, the first UE 102 can be UE 102A shown in FIGS. 1 and 3.

At operation 702, the first UE 102 can be engaged in a first call session 300A with a second UE 102, such as UE 102B shown in FIGS. 1 and 3. For example, the first and second UEs 102 can have exchanged SIP messages through or more call application servers 106 to establish the first call session 300A as part of a first dialog between the first and second UEs 102.

At operation 704, the first UE 102 can also be engaged in a second call session 300B with a third UE 102, such as UE 102C shown in FIG. 1. For example, the first and third UEs 102 can have exchanged SIP messages through or more call application servers 106 to establish the second call session 300B as part of a second dialog between the first and third UEs 102. In some examples, the first UE 102 may have placed the first call session 300A with the second UE 102 on hold to initiate the second call session 300B with the third UE 102 or to accept the third UE's initiation of the second call session 300B.

During operations 702 and 704, the first UE 102 can display a call mode UI 202, for example via a communication application 110 that can provide both call and meeting functions. In some examples, the call mode UI 202 can present options that allow a user to put the active call session 300 on hold and/or return an on-hold call session 300 to being active.

At operation 706, the first UE 102 can receive user input instructing the first UE 102 to initiate a call to meeting upgrade. For example, the user input can be an activation of a meeting upgrade selector 214 displayed in a call mode UI 202 of a communication application 110. The call to meeting upgrade can apply to any or all of the current call sessions 300, even if one or more of the call sessions 300 is on hold. For example, a user of the first UE 102 can initiate a call to meeting upgrade while the first call session 300A is on hold and the second call session 300B is active, such that both call sessions 300 can be upgraded into a single meeting session 302 between the first UE 102, the second UE 102, and the third UE 102.

At operation 708, in response to the user input instructing the first UE 102 to initiate a call to meeting upgrade, the first UE 102 can send a meeting request 304 to a conference application server 108. In some examples, the first UE 102 can send the meeting request 304 to the conference application server 108 via a call application server 106 to which it is already connected with respect to either or both call sessions 300. However, in other examples, the first UE 102 can send the meeting request 304 directly to the conference application server 108.

At operation 710, the first UE 102 can receive meeting information about a new meeting session 302 established by the conference application server 108 in response to the meeting request 304. In some examples, the first UE 102 can receive the meeting information in a meeting confirmation 306 that was received by a call application server 106 from the conference application server 108 and forwarded by the call application server 106 to the first UE 102. In other examples, the first UE 102 can receive the meeting information in a meeting confirmation 306 sent directly to the first UE 102 from the conference application server 108.

At operation 712, the first UE 102 can join the meeting session 302 and change the displayed UI to a meeting mode UI 204. For example, a communication application 110 handling the call session 300 can use the meeting information, such as a link, meeting ID, and/or other information to join the meeting session 302 established by the conference application server 108 and transition its display from the call mode UI 202 to the meeting mode UI 204. The first UE 102 can join the meeting session 302 as part of the first and second dialogs established with the second UE 102 and the third UE 102, such that the first and second dialogs are not terminated despite the transition from the call sessions 300 to the meeting session 302.

At operation 714, the first UE 102 can send a meeting referral 308 to the conference application server 108. The meeting referral 308 can include the meeting information about the meeting session 302 and identifiers associated with the second UE 102 and the third UE 102, such that the conference application server 108 can invite the second UE 102 and the third UE 102 to the meeting session 302. In other examples, the first UE 102 can send separate meeting referrals 308 for each UE 102 that is to be invited to the meeting session 302. In some examples, the first UE 102 can send the one or more meeting referrals 308 to the one or more call application servers 106 associated with the call sessions 300, which can then forward the one or more meeting referrals 308 to the conference application server 108. However, in other examples, the first UE 102 can send the one or more meeting referrals 308 directly to the conference application server 108. In some examples, if a meeting referral 308 or other information identifying the second UE 102 and the third UE 102 as meeting participants was included in the meeting request 304 sent at operation 708, operation 714 can be skipped.

At operation 716, the first UE 102 can terminate its legs of the first call session 300A and the second call session 300B. In some examples, the first UE 102 can receive one or more end call instructions 314 from the one or more call application servers 106 that cause the first UE 102 or its communication application 110 to terminate the first UE's legs of the call sessions 300. In other examples, an end call instruction 314 can be a notification that a call application server 106 has terminated a leg of a call session 300. In still other examples, after the first UE 102 determines that the second UE 102 and/or the third UE 102 have joined the meeting session 302 along with the first UE 102, the first UE 102 can transmit an end call instruction 314 to the one or more call application servers 106, the second UE 102, and/or the third UE 102 to cause the original call sessions 300 to be terminated.

Despite termination of the first and the second call sessions 300, due to the switch to presenting the meeting mode UI 204 and/or because the first UE 102 considers the meeting session 302 to be part of the same dialogs with the second UE 102 and the third UE 102 as the original call sessions 300, the transition to the meeting session 302 can appear to a user of the first UE 102 to be a seamless upgrade from the calls to a meeting.

Figure 8:
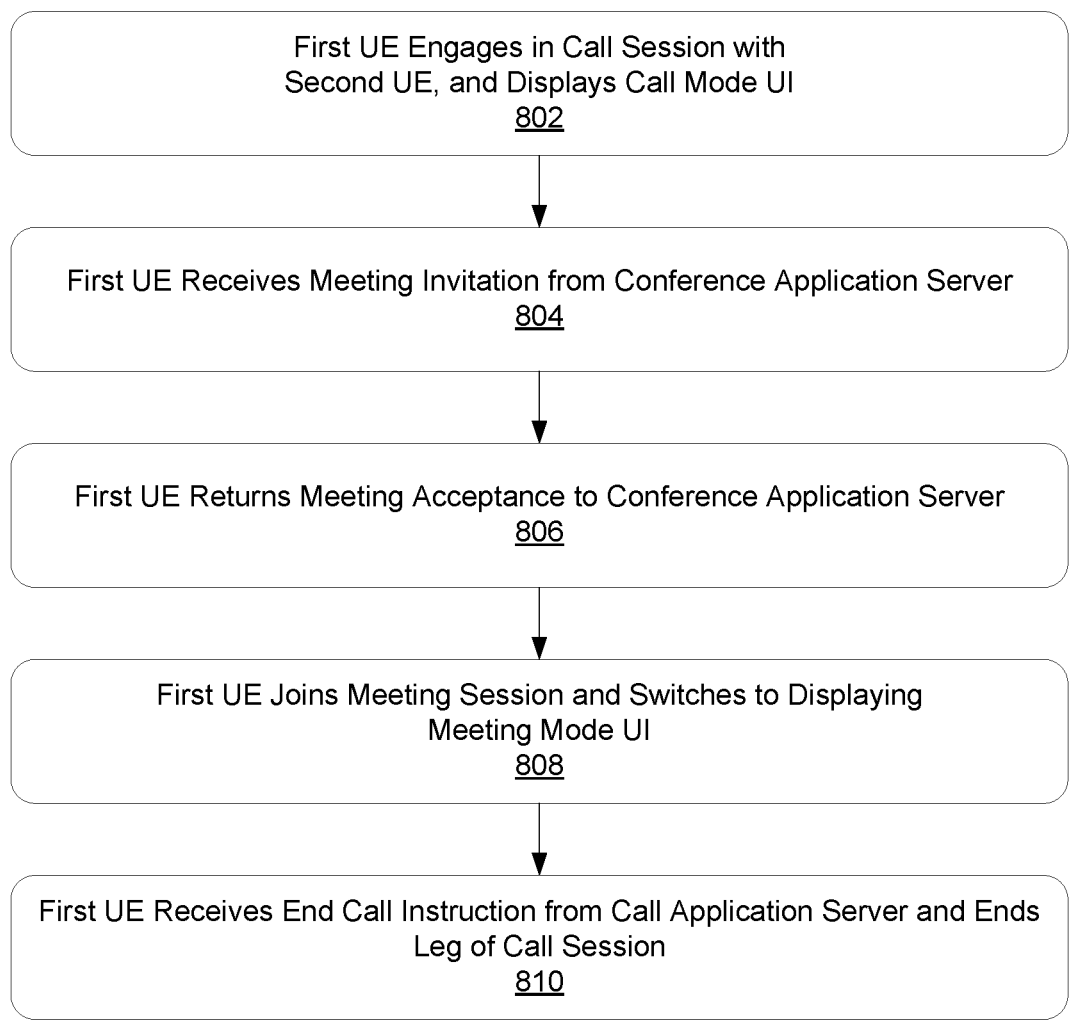
FIG. 8 depicts a flow chart of an example process for upgrading a call to a meeting automatically at a first UE when a second UE initiates a call to meeting upgrade process.

FIG. 8 depicts a flow chart of an example process for upgrading a call to a meeting automatically at a first UE 102 when a second UE 102 initiates a call to meeting upgrade process. In some examples, here the first UE 102 can be UE 102B shown in FIGS. 1 and 3, while the second UE 102 can be UE 102A shown in FIGS. 1 and 3.

At operation 802, the first UE 102 can be engaged in a call session 300 with the second UE 102. For example, the first and second UEs 102 can have exchanged SIP messages through or more call application servers 106 to establish a call session 300 as part of a dialog between the first and second UEs 102. The first UE 102 can display a call mode UI 202 during the call session 300, for example via a communication application 110 that can provide both call and meeting functions.

At operation 804, the first UE 102 can receive a meeting invitation 310 that originated from a conference application server 108. In some examples, the conference application server 108 may have sent the meeting invitation 310 to the call application server 106 associated with the call session 300 between the first UE 102 and the second UE 102, and the call application server 106 may have forwarded the meeting invitation 312 to the first UE 102. In other examples, the conference application server 108 may have sent the meeting invitation 310 directly to the first UE 102. The meeting invitation 310 can indicate meeting information about a meeting session 302 established by the conference application server 108 in response to a call to meeting upgrade process initiated by the second UE 102. In some examples, the second UE 102 may have placed the call session 300 with the first UE 102 on hold prior to initiating the call to meeting upgrade, while in other examples the call session 300 between the first UE 102 and the second UE 102 may have been active when the second UE 102 initiated the call to meeting upgrade.

At operation 806, the first UE 102 can return a meeting acceptance 312 to the conference application server 108 in response to the meeting invitation 312. In some examples, the first UE 102 can send the meeting acceptance 312 to the call application server 106, which can in turn forward the meeting acceptance 312 to the conference application server 108. In other examples, the first UE 102 can send the meeting acceptance 312 to the conference application server 108 directly.

At operation 808, the first UE 102 can join the meeting session 302 and change the displayed UI to a meeting mode UI 204. For example, a communication application 110 handling the call session 300 can use the meeting information, such as a link, meeting ID, and/or other information to join the meeting session 302 established by the conference application server 108 and transition its display from the call mode UI 202 to the meeting mode UI 204. The first UE 102 can join the meeting session 302 as part of the same dialog with the second UE 102, such that the dialog is not terminated despite the transition from the call session 300 to the meeting session 302. In some cases, the first UE 102 can join the meeting session 302 and transition to displaying the meeting mode UI 204 even though the call to meeting upgrade was requested by the second UE 102.

At operation 810, the first UE 102 can receive an end call instruction 314 that causes the first UE 102 to end its leg of the original call session 300. In some examples, the end call instruction 314 can originate from the call application server 106 after both the first UE 102 and second UE 102 have joined the meeting session 302. In other examples, the end call instruction 314 can originate from the second UE 102 after both the first UE 102 and second UE 102 have joined the meeting session 302. In some examples, the first UE 102 or its communication application 110 can terminate its leg of the call session 300 with the call application server 106 in response to the end call instruction 314. In other examples, the end call instruction 314 can be a notification that the call application server 106 has terminated the leg of the call session 300.

Figure 9:
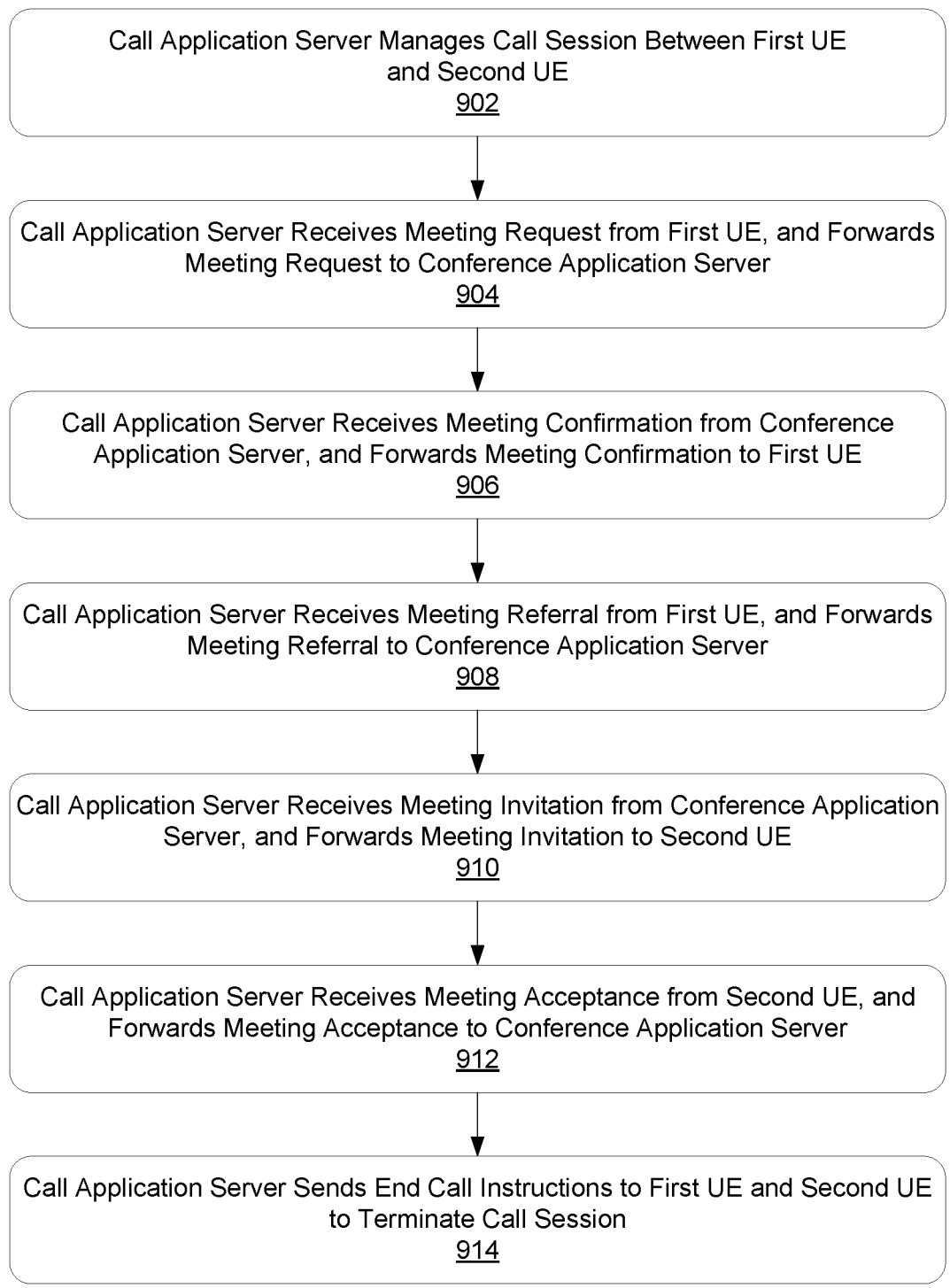
FIG. 9 depicts a flow chart of an example process by which a call application server can assist in upgrading a call between two UEs to a meeting between the two UEs.

FIG. 9 depicts a flow chart of an example process by which a call application server 106 can assist in upgrading a call between two UEs 102 to a meeting between the two UEs that is managed by a conference application server 108.

At operation 902, the call application server 106 can manage a call session 300 between a first UE 102 and a second UE 102, such as UE 102A and UE 102B shown in FIGS. 1 and 3. For example, the call application server 106 can route SIP messages between the first and second UEs 102 during setup of the call session 300 and/or during the call session 300.

At operation 904, the call application server 106 can receive a meeting request 304 from the first UE 102. The call application server 106 can forward the meeting request 304 to a conference application server 108.

At operation 906, the call application server 106 can receive a meeting confirmation 306 from the conference application server 108. The call application server 106 can forward the meeting confirmation 306 to the first UE 102.

At operation 908, the call application server 106 can receive a meeting referral 308 from the first UE 102. The call application server 106 can forward the meeting referral 308 to the conference application server 108. The meeting referral 308 can be a request from the first UE 102 to have the second UE 102 invited to the meeting session 302. In some examples, if a meeting referral 308 or other information identifying the second UE 102 as a meeting participant was included in the meeting request 304 received at operation 904, operation 908 can be skipped.

At operation 910, the call application server 106 can receive a meeting invitation 310 from the conference application server 108. The meeting invitation 310 can identify the second UE 102 and include meeting information about the meeting session 302. The call application server 106 can forward the meeting invitation 310 to the second UE 102.

At operation 912, the call application server 106 can receive a meeting acceptance 312 from the second UE 102. The call application server 106 can forward the meeting acceptance 312 to the conference application server 108. The meeting acceptance 312 can be a response from the second UE 102 indicating that it has joined the meeting session 302 or will be joining the meeting session 302.

At operation 914, the call application server 106 can send end call instructions 314 to the first UE 102 and the second UE 102 to terminate their legs of the call session 300. The call application server 106 can determine that the end call instructions 314 should be sent based on information indicating that both the first UE 102 and the second UE 102 have joined the meeting session 302. For example, the call application server 106 can determine that the first UE 102 has joined the meeting session 302 based on the receipt of the meeting confirmation 306 from the conference application server 108 and/or the meeting referral 308 from the UE 102. The call application server 106 can determine that the second UE 102 has joined the meeting session 302 based on the receipt of the meeting acceptance 312. Although in some examples the end call instructions 314 can instruct the first UE 102 and the second UE 102 to release their legs of the call session 300, in other examples the call application server 106 can terminate the legs of the call session 300 and the end call instructions 314 can be notifications to the first UE 102 and the second UE 102 that the legs of the call session 300 have been terminated.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
   displaying, by a communication application of first user equipment (UE), a call mode user interface of the communication application during a call session between the first UE and a second UE that is being managed by a call application server;
   receiving, by the first UE during the call session, a user input requesting that the call session be upgraded to a meeting session;
   sending, by the first UE, a meeting request to a conference application server, wherein sending the meeting request to the conference application server comprises sending the meeting request to the call application server with the conference application server as a destination of the meeting request;
   receiving, by the first UE, a meeting confirmation from the conference application server, wherein the meeting confirmation indicates that the conference application server has set up the meeting session and includes meeting information associated with the meeting session;
   joining, by the first UE, the meeting session based on meeting information in the meeting confirmation;
   sending, by the first UE, a meeting referral to the conference application server requesting that the second UE be invited to the meeting session, wherein sending the meeting referral to the conference application server comprises sending the meeting referral to the call application server with the conference application server as a destination of the meeting referral;
   ending, by the first UE, a leg of the call session after the second UE has joined the meeting session; and
   switching, by the communication application of the first UE, to displaying a meeting mode user interface of the communication application upon joining the meeting session, wherein the meeting mode user interface includes an option for at least one of a whiteboard function or a screen sharing function.

2. The method of claim 1, wherein the communication application is run at, or accessed by, the first UE and engages in the call session, receives the user input, sends the meeting request, receives the meeting confirmation, joins the meeting session, and sends the meeting referral.

3. The method of claim 1, wherein:
   the user input is received by the first UE during the call session with the second UE and also during a second call session with a third UE, and
   the meeting referral requests that both the second UE and the third UE be invited to the meeting session.

4. The method of claim 3, wherein at least one of the call session and the second call session is on hold when the user input is received.

5. The method of claim 1, wherein the meeting session provides one or more meeting functions that are unavailable to the first UE and the second UE during the call session.

6. The method of claim 5, wherein the meeting functions include at least one of the whiteboard function or the screen sharing function.

7. The method of claim 1, wherein the meeting information includes at least one of link information and a meeting identifier that the first UE can use to join the meeting session.

8. A call application server comprising:
   one or more processors; and
   memory storing computer-executable instructions that, when executed by the one or more processors, cause the call application server to perform operations comprising:
      managing call session between a first user equipment (UE) and a second UE;
      routing one or more meeting setup messages between the first UE and a conference application server that is configured to set up a meeting session for the first UE and the second UE;
      routing one or more meeting invitation messages between the conference application server and the second UE, wherein the operation of routing the one or more meeting invitation messages comprises:
         receiving a meeting invitation from the conference application server and forwarding the meeting invitation to the second UE, and
         receiving a meeting acceptance from the second UE and forwarding the meeting acceptance to the conference application server;
      determining that both the first UE and the second UE have joined the meeting session based on at least some of the one or more meeting setup messages and the one or more meeting invitation messages; and
      sending end call instructions to the first UE and the second UE in response to determining that both the first UE and the second UE have joined the meeting session, wherein the end call instructions instruct the first UE and the second UE to end the call session.

9. The call application server of claim 8, wherein the operation of routing the one or more meeting setup messages comprises:
receiving a meeting request from the first UE during the call session and forwarding the meeting request to the conference application server, wherein the meeting request is a request to upgrade the call session to the meeting session;
receiving a meeting confirmation from the conference application server and forwarding the meeting confirmation to the first UE; and
receiving a meeting referral from the first UE requesting that the second UE be invited to the meeting session and forwarding the meeting referral to the conference application server.

10. The call application server of claim 8, wherein the call application server communicates with a communication application associated with the first UE when managing the call session, routing the one or more meeting setup messages, and sending the end call instructions.

11. The call application server of claim 8, wherein the call application server routes the one or more meeting setup messages during the call session.

12. A first user equipment (UE) comprising:
a processor; and
a plurality of programming instructions that, when executed by the processor, cause the first UE to perform operations including:
displaying, by a communication application of first user equipment (UE), a call mode user interface of the communication application during a call session between the first UE and a second UE that is being managed by a call application server;
receiving, by the first UE during the call session, a user input requesting that the call session be upgraded to a meeting session;
sending, by the first UE, a meeting request to a conference application server;
receiving, by the first UE, a meeting confirmation from the conference application server, wherein the meeting confirmation indicates that the conference application server has set up the meeting session and includes meeting information associated with the meeting session;
joining, by the first UE, the meeting session based on meeting information in the meeting confirmation;
sending, by the first UE, a meeting referral to the conference application server requesting that the second UE be invited to the meeting session;
ending, by the first UE, a leg of the call session after the second UE has joined the meeting session; and
switching, by the communication application of the first UE, to displaying a meeting mode user interface of the communication application upon joining the meeting session, wherein the meeting mode user interface includes an option for at least one of a whiteboard function or a screen sharing function,
wherein the meeting request, the meeting confirmation, and the meeting referral are exchanged between the first UE and the conference application server via the call application server.

13. The first UE of claim 12, wherein:
the user input is received by the first UE during the call session with the second UE and also during a second call session with a third UE, and
the meeting referral requests that both the second UE and the third UE be invited to the meeting session.

14. The method of claim 1, wherein the meeting session provides one or more meeting functions that are unavailable to the first UE and the second UE during the call session.

15. The first UE of claim 14, wherein the meeting functions include at least one of the whiteboard function or the screen sharing function.

16. The first UE of claim 1, wherein the meeting information includes at least one of link information and a meeting identifier that the first UE can use to join the meeting session.

* * * * *